United States Patent

[11] 3,586,932

[72] Inventor Richard A. Kokosa
Skaneateles, N.Y.
[21] Appl. No. 884,659
[22] Filed Dec. 12, 1969
[45] Patented June 22, 1971
[73] Assignee General Electric Company

[54] FIVE LAYER GATE CONTROLLED THYRISTOR WITH NOVEL TURN ON CHARACTERISTICS

24 Claims, 8 Drawing Figs.

[52] U.S. Cl. .......... 317/235 R, 317/235 AA, 317/235 AB
[51] Int. Cl. .......... H01l 19/00
[50] Field of Search .......... 317/234, 235, 40.12, 41, 41.1; 307/305

[56] References Cited

UNITED STATES PATENTS

| | | | |
|---|---|---|---|
| 3,360,696 | 12/1967 | Neilson et al. | 317/235 |
| 3,391,310 | 7/1968 | Gentry | 317/235 |

FOREIGN PATENTS

| | | | |
|---|---|---|---|
| 1,126,459 | 9/1968 | Great Britain | 317/235 |
| 1,530,036 | 5/1968 | France | 317/235 |

*Primary Examiner*—John W. Huckert
*Assistant Examiner*—Andrew J. James
*Attorneys*—Robert J. Mooney, Nathan J. Cornfeld, Carl O. Thomas, Frank L. Neuhauser, Oscar B. Waddell and Joseph B. Forman

ABSTRACT: A semiconductive element is provided having five successive layers of alternating conductivity type in which a first endmost layer is interposed between a main zone and an auxiliary zone of an adjacent intermediate layer. A junction bridging conductor extends from the auxiliary zone to an adjacent edge of the endmost layer while the remaining edge of the endmost layer is located in lateral proximity to the main zone. Ohmic contacts are associated with the main zone and a remaining endmost layer. The remaining endmost layer may be segmented. A junction bridging connector may extend from an auxiliary segment of the remaining endmost layer toward a remaining segment thereof at a location which overlies the edge of the main zone associated with the first endmost layer. The first endmost layer and the conductor associated therewith may be distributed to lie adjacent opposed peripheries of the main zone, and the auxiliary segment and its associated conductor may be similarly distributed. The auxiliary segment and the first endmost layer may be also divided to provide ballast resistances in the intermediate layers next adjacent thereto.

INVENTOR:
RICHARD A. KOKOSA,

BY Carl O. Thomas
HIS ATTORNEY.

INVENTOR:
RICHARD A. KOKOSA,

BY Carl O. Thomas

HIS ATTORNEY.

PATENTED JUN 22 1971

3,586,932

INVENTOR:
RICHARD A. KOKOSA,

BY Carl O. Thomas
HIS ATTORNEY.

FIVE LAYER GATE CONTROLLED THYRISTOR WITH NOVEL TURN ON CHARACTERISTICS

My invention is directed to gate controlled thyristors having improved switching capabilities.

As is well understood in the art gate controlled thyristors are limited in the rate at which current conduction can be increased, typically referred to as di/dt. It has also been observed that the maximum safely employable value of di/dt for a given thyristor is a direct function of the value of the gate signal being utilized to control the thyristor.

I have invented a novel gate controlled thyristor structure which increases acceptable di/dt levels and which accordingly permits weaker gate signals to be employed in obtaining a given turn on rate. Additionally, in one aspect, my invention is directed to a gate controlled thyristor structure in which acceptable values of di/dt are increased whether the device is switched to its conducting mode by a gate or by main terminal applied voltages. In an additional aspect my invention may incorporate lateral resistances to assist in distributing turn on.

In one aspect my invention is directed to a thyristor comprised of a semiconductive crystal element including five layers of one and the opposite conductivity type extending between opposed major surfaces. The layers are interleaved with adjacent layers being of opposite conductivity type and forming a plurality of PN junctions. The layers include a first endmost layer and a first intermediate layer next adjacent thereto. The first intermediate layer includes a main zone and an auxiliary zone having the first endmost layer interposed therebetween and an injection zone integrally uniting the main and auxiliary zones. A first major contact is ohmically associated with the main zone. A second major contact is ohmically associated with a remaining endmost of the layers. A gate contact is ohmically associated with an intermediate layer other than the first intermediate layer, and means are provided to form a junction bridging conductive path from the auxiliary zone to the first endmost layer.

In another aspect my invention is directed to a semiconductor switch comprising a single semiconductive crystal means having integrated therein a remote gate main current carrying thyristor crystal means and an auxiliary thyristor crystal means. The remote gate main current carrying thyristor means includes a gate layer, a first emitter layer, a first base layer, a second base layer, and a second emitter layer sequentially related, adjacent layers being of opposite conductivity type and forming a plurality of PN junctions therebetween. The auxiliary thyristor means includes a first emitter layer, a first base layer, a second base layer, and a second emitter layer sequentially related, adjacent layers being of opposite conductivity type and forming a plurality of PN junctions therebetween. Corresponding layers of the main and auxiliary thyristor means are integrally related with the gate layer lying adjacent the joinder of the thyristor means. Gate means are associated with one of the base layers of the auxiliary thyristor means, and common current carrying terminal means are associated with the second emitter layers of the thyristor means. Separate current carrying terminal means are associated with each of the first emitter layers of the thyristor means and laterally spaced from the gate layer. Means are provided to form a conductive path between the auxiliary thyristor means separate terminal means and an edge of the gate layer adjacent the auxiliary thyristor means for laterally biasing the gate layer in response to a signal supplied to the gate means so that electrons are preferentially injected by the gate layer into the first base layer along an edge closest to the terminal means associated with the first emitter layer of the main thyristor means.

My invention may be better understood by reference to the following detailed description considered in conjunction with the drawings, in which FIG. 1 is a vertical section of a gate controlled thyristor according to my invention with the semiconductive element being shown in elevation;

Figure 2:
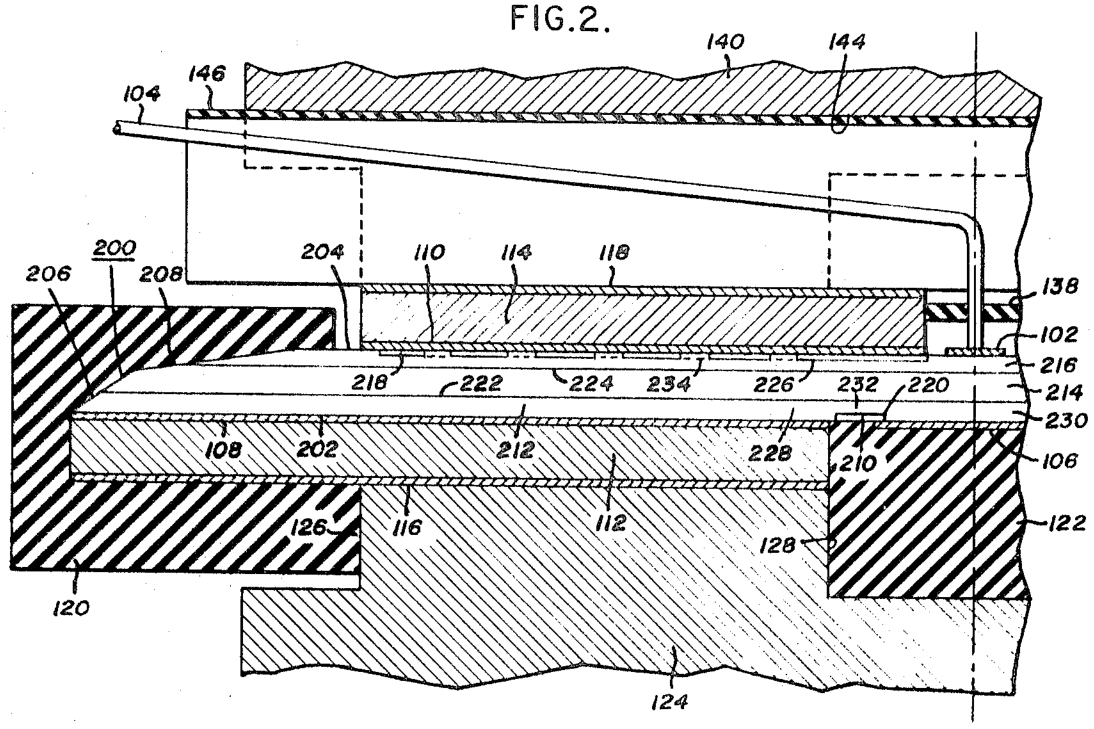
FIG. 2 is a sectional detail of the controlled thyristor of FIG. 1.
Figure 4:
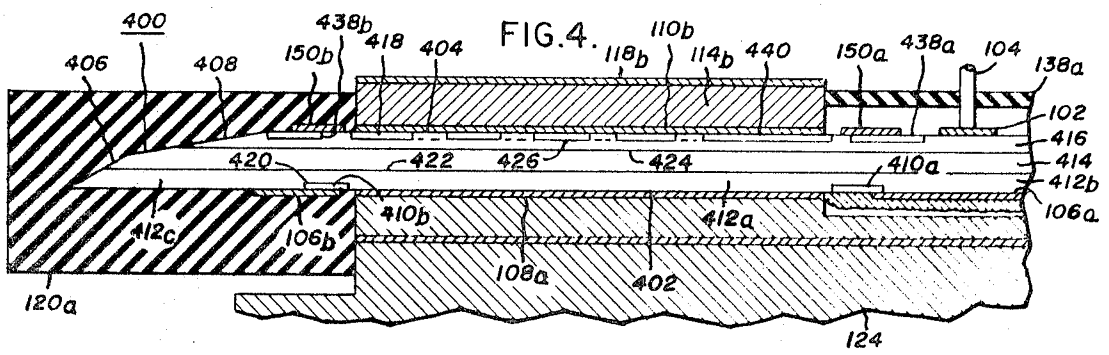
FIGS. 4 and 5 are directed to a third embodiment of my invention showing sectional details similar to FIG. 2.
Figure 5:
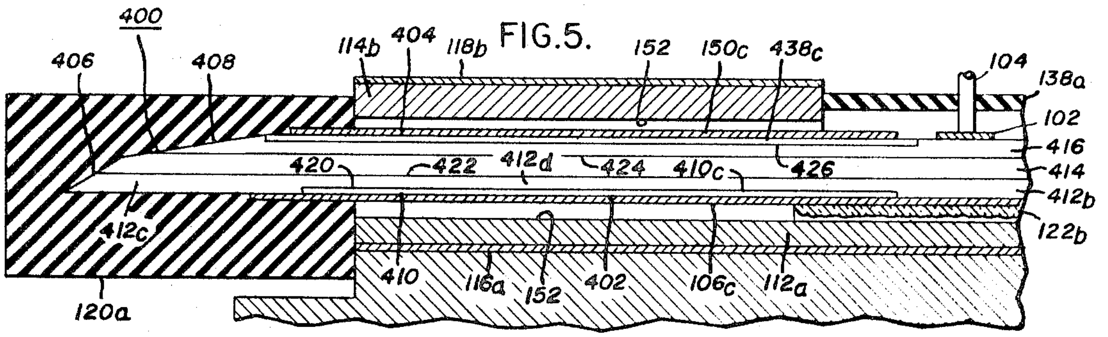
Figure 7:
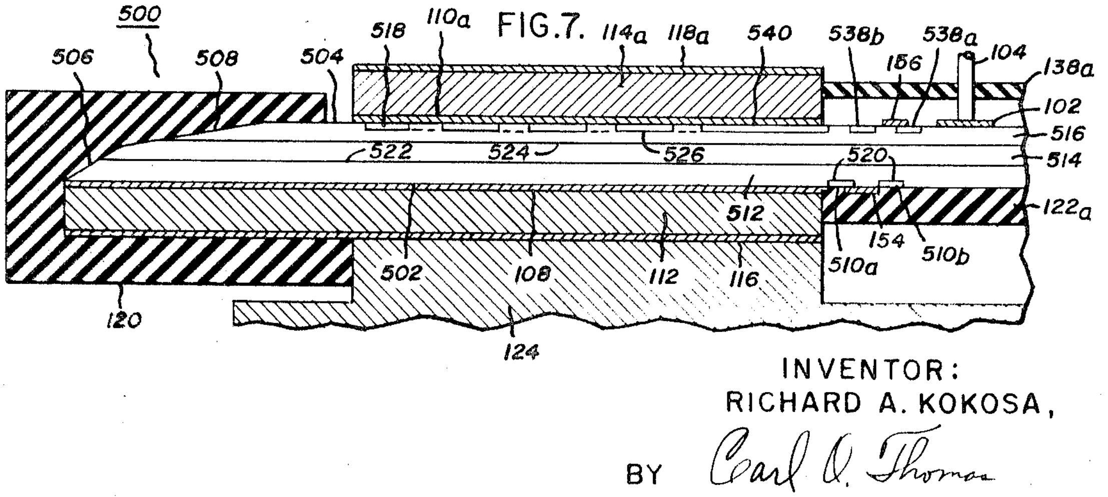
Figure 6A:
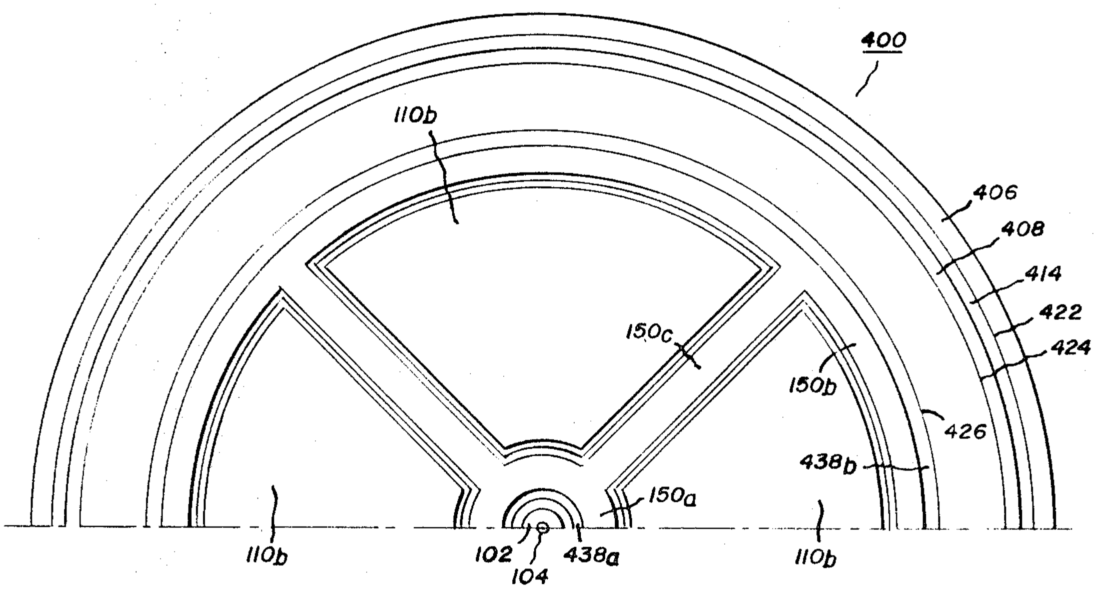
Figure 6B:
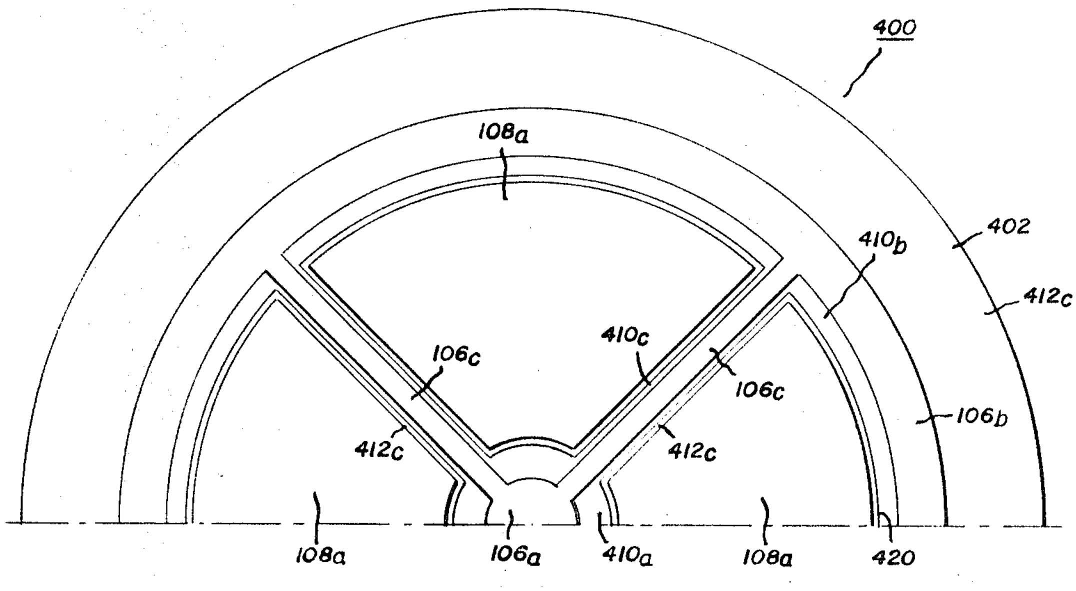

FIGS. 6*a* and 6*b* are plan views of the semiconductive element, contacts, and conduction layers, of the embodiment shown in FIGS. 4 and 5, FIG. 6*a* being a plan view of the first major surface of the semiconductive element and FIG. 6*b* a plan view of the second major surface; and FIG. 7 is a sectional detail similar to FIG. 2 of a fourth embodiment of my invention.

Each of the semiconductive elements, contacts, and conduction layers are symmetrical about the center axis shown in each figure. Section lines are omitted from the semiconductive elements to avoid cluttering the drawings. The thicknesses of the semiconductive elements are exaggerated in the drawings to allow the layers thereof to be readily viewed.

Figure 1:
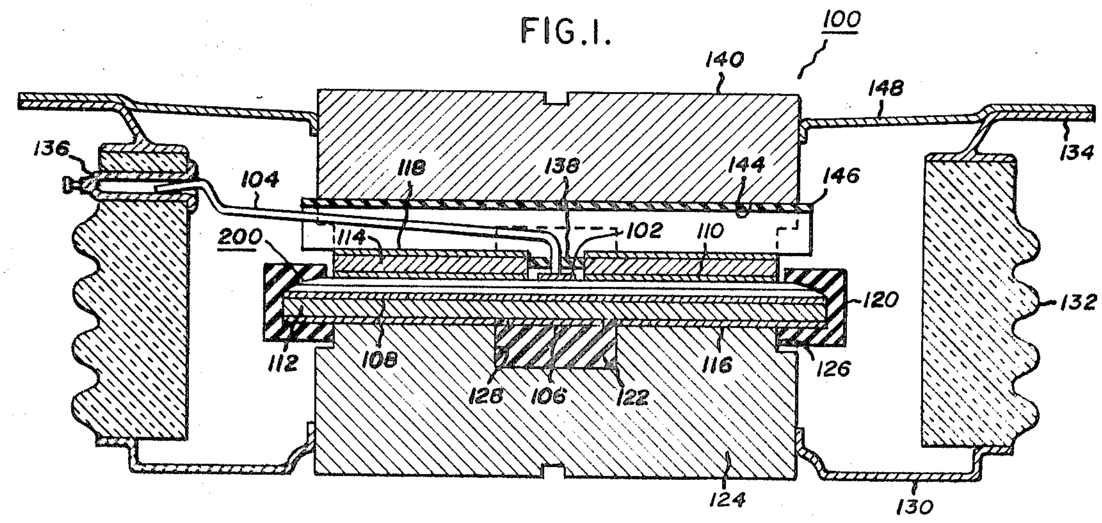

In FIG. 1 a controlled rectifier or thyristor 100 is shown provided with a semiconductive element 200. As best appreciated by reference to FIG. 2, the monocrystalline semiconductive element 200 is provided with first and second opposed major surfaces 202 and 204, respectively, joined by annular beveled peripheral surfaces 206 and 208. The semiconductive element is formed of a single semiconductive crystal, preferably a silicon crystal, which is divided into five sequential, successive zones or layers 210, 212, 214, 216, and 218. Adjacent of the zones are of opposite conductivity type or, alternately stated, zones of a first conductivity type are interleaved with zones of opposite conductivity type, so that a plurality of junctions 220, 222, 224, and 226 are formed between the adjacent layers. First endmost layer 210, hereinafter designated a gate layer, is located adjacent the first major surface and forms a junction 220 with next adjacent intermediate layer 212, hereinafter designated a first emitter layer. First base layer 214 forms with the first emitter layer a first emitter junction 222 and forms with a second base layer 216 a base junction 224. The second base layer forms with the second emitter layer 218 a second emitter junction 226. In the preferred form the gate, first base, and second emitter layers are of N conductivity type while the first emitter and second base layers are of P conductivity type. It is, of course, recognized that the conductivity types could be reversed, in which case a complementary thyristor would be formed.

According to common manufacturing techniques it is recognized that the first base layer will normally exhibit highest resistivity, the first emitter and second base layers intermediate resistivity, and the gate and second emitter layers lowest resistivity, since the semiconductive crystal may initially exhibit conductivity characteristics corresponding to that of the first base layer while the first emitter and second base layers may be formed by a first impurity diffusion while the gate and second emitter layers may be formed by one or more subsequent diffusions.

Accordingly, the beveled peripheral surface 206 will normally form a positive bevel angle at its edge intersection with the first emitter junction while the beveled peripheral surface 208 will form a negative bevel angle with the base junction 224. While beveled peripheral surfaces are not essential to the practice of my invention, I prefer to form a positive bevel angle with the first emitter junction of less than 90° and normally less than 45°, it being recognized that the shallower the acute included angle between the beveled surface 206 and the first emitter junction the higher will be the surface voltage blocking capabilities of this junction. The negative acute included bevel angle between the base junction and beveled surface 208 is preferably maintained in the range of from 4 to 20°, most preferably from 4 to 9°. It is normally preferred to choose the bevel angles of the peripheral surfaces so that surface voltage blocking capabilities of the junctions exceed the avalanche or bulk voltage capabilities. In such instance if excessive voltage differentials (or excessive rates of voltage increase) are imposed between the major surfaces of the semiconductive element to drive the semiconductive element into conduction without a gate signal, nondestructive turn on of the device will occur rather than destructive surface current conduction. It is recognized that the choice of peripheral surface bevels to allow selective avalanche or bulk breakdown of semiconductor devices is conventional and is pertinent to my invention only in combination with structural features to be described hereinafter.

It is to be noted that the endmost gate layer is interposed between a main zone 228 and an auxiliary zone 230 of the first emitter layer which are integrally joined by an injection zone 232. It is also to be noted that the second base layer extends to the second major surface of the semiconductive element centrally of the second emitter layer. Additionally the second base layer is shown provided with a plurality of dot shorts 234 that extend to the second major surface through apertures in the second emitter layer. The dot shorts are generally uniformly distributed over the surface area subtended by the second emitter layer, except that the dot shorts are preferably spaced outwardly from the inner edge of the second emitter layer by a distance sufficient to avoid any undue loss of gate sensitivity. Typically the dot short nearest the inner edge of the second emitter layer is spaced at least 15 mils therefrom. For purposes of analyzing the behavior of the semiconductive element the first and second base layers and the second emitter layer may be considered to be made up of integrally joined main portions lying outwardly of the inner edge of the gate layer and auxiliary portions lying inwardly thereof.

Gate metallization 102 is located centrally of the second major surface of the semiconductive element. Typically the gate metallization is of limited lateral extent and serves merely to provide a low impedance ohmic conduction path between the gate lead 104 and the second base layer. An ohmic conduction layer 106 is shown associated with a central portion of the first emitter layer overlying the entire auxiliary zone of this layer and extending laterally to overlie the inner edge of the gate layer. The conduction layer 106 thus serves to short the junction 220 at its intersection with the first major surface.

A first major contact 108 is ohmically associated with the first major surface of the semiconductive element overlying substantially the entire main zone of the first emitter layer, but laterally spaced from the outer edge of the junction 220 so that it does not short this junction. A second major contact 110 is ohmically associated with the second major surface. The second major contact is spaced outwardly from the inner edge of the second emitter junction 226, so that shorting of this junction adjacent its inner intersection with the second major surface is avoided. The second major contact does, however, short the junction 226 where it forms the periphery of the dot shorts. As shown the second major contact extends laterally beyond the second emitter layer and shorts the outer periphery of the second emitter junction.

While for simplicity the gate metallization, conduction layer, and first and second major contacts are shown formed as unitary metal layers, it is appreciated that these elements may be formed of one or a plurality of layers of like or dissimilar metals, as is well understood in the art. It is preferred that these elements be plated or otherwise bonded directly onto the opposed major surfaces of the semiconductive element prior to its association with the remaining elements of the semiconductor device, so that these elements form a low impedance interface with the semiconductive element.

It is to be noted that the conduction layer 106 and auxiliary zone 230 are both associated with a portion of the first major surface of the semiconductive element that overlaps a portion of the second major surface associated with the auxiliary portion of the second emitter layer and a portion of the second major contact 110. Alternately viewed, it can be seen that immediately laterally inward of the gate layer, the conduction layer, the auxiliary zone, the auxiliary portions of the first and second base and second emitter layers, and the second major contact are sequentially arranged in a direction taken normal to the major surfaces of the semiconductive element. Thus, a PNPN sequence of semiconductive layers is provided. Similarly, the main zone of the first emitter layer and the first main contact are noted to be associated with a portion of the first major surface that overlaps a portion of the second major surface having associated therewith the second emitter layer and the second major contact. Thus, a second, laterally spaced PNPN sequence of semiconductive layers is provided.

Annular back up plates 112 and 114 are associated with the first and second major contacts, respectively. These back up plates are shown laterally coextensive with the major contacts. Where the semiconductive element is formed of a silicon crystal it is preferred to utilize a metal, such as tungsten, molybdenum, or tantalum, which exhibits a thermal coefficient of expansion of less than $1\times10^{15}$ in/in per °C., most preferably less than $0.5\times10^{15}$ in/in per °C. One or both of the back up plates may be directly bonded to the major contacts or only physically associated therewith, free of direct bonding. The exterior major surfaces of the back up plates are covered with layers 116 and 118 formed of a malleable conductive metal, such as silver or gold.

According to a preferred assembly procedure the back up plate 112 is joined to the semiconductive element after association of the metal layers 102, 106, 108, and 110 so that a subassembly is formed. A dielectric body 120 of passivant material is then molded around the periphery of the subassembly. The dielectric passivant material is chosen to exhibit a relatively high insulative resistance and dielectric strength and to be substantially impervious to junction contaminants. I prefer to utilize passivant materials having a dielectric strength of at least 100 volts/mil and an insulative resistance of at least $10^{10}$ ohm-cm. A number of commercially available forms of silicone rubber are noted to meet these electrical criteria. It is anticipated that glass or other conventional passivant materials may be interposed between the molded dielectric body and the surface of the semiconductive element. In such case it is recognized that the function of junction passivant and insulation of the semiconductive element peripheral surface will be primarily performed by the interposed passivant and that the electrical and passivant qualifications of the molded dielectric body may be accordingly reduced. A central dielectric body 122 is located interiorly of the annular backup plate 112 and may be formed of the same passivant material as the body 120. In addition to protecting the semiconductive element where junctions intersect the surface the dielectric bodies also aid in positioning the subassembly with respect to the terminals of the device.

As best seen in FIG. 1 the housing for the semiconductor device is comprised of a first terminal member 124 typically formed of a conductive metal such as copper. The first terminal member is provided with a pedestal 126 having a central well 128. The dielectric body 120 cooperates with the outer periphery of the pedestal to position the lower back up plate and the semiconductive element with respect thereto. The central dielectric body 122 also cooperates with the well to assist in positioning of these elements.

An annular flange 130 is secured at its inner edge to the periphery of the first terminal member and is attached to an annular insulator 132 adjacent its outer edge. The insulator is provided with protuberances adjacent its outer edge to increase the creepage path along this surface. The insulator is noted to be mounted in laterally spaced relation to the semiconductive element and first terminal member. An annular flanged sealing ring 134 is secured to the opposite end of the insulator. Typically the first terminal member, annular flange, annular insulator, and flanged sealing ring are joined as a subassembly which receives the subassembly formed by the semiconductive element, lower back up plate, metallization layers secured to the semiconductive element, and the dielectric bodies of molded passivant material. THe malleable layer 116 associated with the exterior major surface of the backup plate next adjacent the pedestal assures an intimate, low impedance electrical and thermal contact between the first terminal member and the semiconductive element.

The annular insulator is sealingly fitted with an outwardly closed conductive sleeve 136 which serves as a gate terminal for the device. One extremity of the resilient gate lead 104 is slipped into the inner end of the gate terminal sleeve and the opposite end is positioned to overlie the gate metallization. The resiliency of the gate lead assures that the proper degree of compressive force is maintained on the gate metallization to assure a low impedance gate terminal interconnection to the second base layer through the interfaces of the gate lead with the sleeve and the gate metallization. In order to laterally position the upper backup plate 114 with respect to the second major contact 110 where the back up plate is not directly bonded thereto, but is only physically associated therewith, an insulative spacer 138 is fitted between the gate lead and the inner periphery of the backup plate.

A second terminal member 140 may be formed identically as the first terminal member, but is modified by the provision of a diametrical slot through the pedestal. This slot provides clearance between the gate lead and the second terminal member. To insure that the gate lead is at all times electrically isolated from the second terminal member an insulative slot liner 146 is provided. Attached to the outer periphery of the second terminal member is an annular sealing flange 148 that may be sealingly associated with the flanged ring 134.

The device is assembled by first assembling housing of the device into two separate subassemblies, one of which is comprised of the second terminal member and the annular sealing flange. The remaining elements of the housing form the second subassembly as above noted. The subassembly above described including the semiconductive element and backup plate is positioned on the pedestal of the first terminal member. The upper backup plate and spacer may then be positioned thereabove, and the gate lead is thereafter fitted into position. The upper housing subassembly is then associated with the upper backup plate and the annular flange and flanged ring sealed together, as by welding, to complete the device. Preferably the housing for the device hermetically encases the semiconductive element.

The operation of the semiconductor device 100 may be most readily appreciated by considering the gate layer 210, first base layer 214, and second emitter layer 218 to be of N conductivity type while the first emitter layer 212 and second base layer 216 are of P conductivity type. In such instance the first terminal member 124 of the device serves as its anode while the second terminal member 140 serves as the cathode. The gate lead 104 is referenced to the cathode potential, according to prevailing practice in the use of thyristors. As is well understood in the art, when a negative potential is applied to the first terminal member or anode as compared to the second terminal member or cathode, the device is in its reverse blocking mode and no significant current flows through the device. Current flow through the semiconductive element is effectively blocked by reverse biasing of the anode emitter junction 222. Current flow between the cathode and anode around the peripheral edge of the semiconductive element is prevented by the beveling of the edge 206 of the semiconductive element, which lowers the surface potential gradient across the anode emitter junction, and by the dielectric body 120 of passivant material.

Upon forwardly biasing the semiconductor device in the absence of a gate signal, current flow through the semiconductive element is blocked by the base junction 224. The beveled edge 208 and the passivant material of the dielectric body 120 effectively prevent current flow across the base junction at the surface of the semiconductive element. When the device is forward biased the anode is maintained at a positive potential with respect to the cathode.

In order to switch the semiconductor device to its conducting mode while it is forward biased the gate terminal 136 is biased positive with respect to the cathode or second terminal member 140. This causes electrons to be injected from the second emitter layer across the base junction to drive the center of the semiconductive element into its conductive mode. This may be readily appreciated by considering the central portion of the semiconductive element to approximate an auxiliary thyristor which is integrated with a surrounding main current carrying thyristor. The auxiliary zone 230 of the first emitter layer 212 as well as the portions of the first base, second base, and second emitter layers located centrally of the inner edge of the gate layer 210 and injection junction 220 together form a PNPN sequence of zones that turn on as does a thyristor, In this regard it is to be noted that current conduction from the second emitter layer 218 to the second terminal member or cathode is through the second major contact 110, the backup plate 114, and the conductive layer 118.

While the conduction layer 106 may be viewed as the anode for the auxiliary thyristor, it is a unique feature of my invention that I isolate the conduction layer from conductive association with the anode or first terminal member 124, except through the semiconductive element. The central dielectric body 122 contributes to maintaining this relationship. To achieve conduction from the anode of the semiconductor device to the conduction layer the conduction layer is extended laterally so that it overlaps the inner edge of the gate layer 210 and shorts the junction 220. Thus current flows from the anode through the metal layer 116, backup plate 112, first major contact 108, first emitter layer 212, and gate layer 210 to reach the outer edge of the conduction layer. The lateral resistance to current flow within the gate layer causes a potential difference to develop between its inner and outer edges so that electrons are injected into the first emitter layer from the gate layer along the outer edge of the gate layer. These injected electrons are collected by the first emitter junction and serve to initiate conduction across the base junction, conduction progressing from the outer periphery of the gate layer outwardly to switch the remainder of the semiconductive element.

Turn on of the semiconductive element may then be seen as analogous to turn on of a central auxiliary thyristor, the current produced by which is used to turn on a concentric outer annular main current carrying remote gate thyristor. Turn on or switching of the semiconductor device from its high impedance forward biased condition to its low impedance conducting mode is quite rapid since the output of the auxiliary thyristor serves as an amplified gate signal driving the main thyristor into conduction. This increase in the switching rate constitutes an improvement in the rate of current increase or di/dt that can be tolerated by the device without localized overheating or damage. At the same time since the auxiliary thyristor output is effectively being used to provide gate drive for the remote gate main thyristor it is appreciated that the strength of the gate signal to initiate conduction need only be strong enough to drive the auxiliary thyristor into conduction and need not be strong enough to directly drive the main thyristor without intermediate amplification.

The initiation of lateral current flow from the first major contact laterally through the first emitter layer, across the injection junction 220, laterally across the gate layer, and laterally through the outer edge of the conduction layer for further conduction through the auxiliary zone of the first emitter layer, first base layer, second base layer, and second emitter layer for ultimate conduction to the device cathode is a unique feature of my invention. As above noted I consider the concept of leaving the conduction layer floating, that is, free of external ohmic connection, as to a cathode terminal, to be novel. Further, it is to be noted that the conduction layer preferably only overlaps the inner edge of the gate layer. This accentuates the potential drop in lateral conduction through the gate layer and shifts electron injection more sharply toward the outer periphery of the gate layer than is observed normally in the firing of a remote gate thyristor and improves the electron injection effectiveness of the gate layer. Another feature of importance is the spacing between the outer periphery of the injection junction and the inner periphery of the first major contact. Assuming absolute uniformity of spacing, current flow from the anode to the conductive layer through the injection junction will be peripherally uniformly distributed even in the absence of any lateral resistance to current flow offered by the first emitter layer. In practice, some unevenness in spacing always exists so that a tendency toward conduction through the injection junction at its closest approach to the first major contact exists. It is a feature of my invention that I offset this tendency and assure uniform peripheral conduction through the injection junction by laterally displacing the gate layer from the inner edge of the first major contact by a distance sufficient to provide a significant lateral resistance within the first emitter layer portion serving as a current conduction path therebetween. This then constitutes a resistance in series with any conducting portion of the injection junction and acts further peripherally to distribute current conduction rather than allowing current concentration as might otherwise occur. The lateral resistance is chosen to produce a potential difference in the first emitter layer between the injection junction and the inner periphery of the first major contact of at least one half the value of the contact potential of the injection junction.

Figure 3:
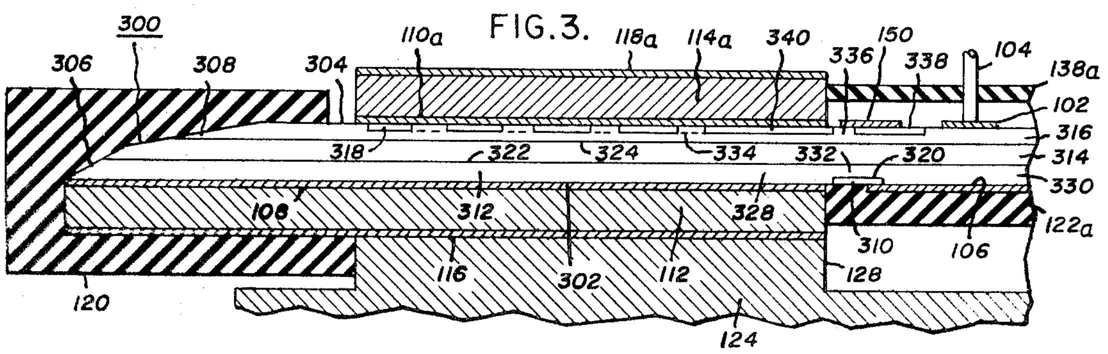
FIG. 3 is a sectional detail similar to FIG. 2 of a modified controlled thyristor according to my invention.

In FIG. 3 a sectional detail similar to FIG. 2 is shown of a second embodiment of my invention. Except as specifically noted the elements of my second embodiment may be chosen to be identical to those of semiconductor device 100. As shown in FIG. 3 the gate metallization 102, gate lead 104, conduction layer 106, first major contact 108, backup plate 112, metal layer 116, dielectric body 120, and first terminal member 124 remain as previously described.

The semiconductive element 300 is provided with a first major surface 302 and a second major surface 304 joined by a positively beveled annular edge 306 and a negatively beveled annular edge 308, which may be identical to beveled edges 206 and 208. The semiconductive element is comprised of a gate layer 310, first emitter layer 312, first base layer 314, second base layer 316, and a second emitter layer 318. Since the layers are formed by interleaved zones of opposite conductivity type, an injection junction 320 is formed between the gate layer and the first emitter layer, a first emitter junction 322 is formed between the first emitter layer and the first base layer, a base junction 324 is formed between the first and second base layers, and a second emitter junction 326 is formed between the second base layer and the second emitter layer. The first emitter layer is comprised of a main zone 328 and an auxiliary zone 330 integrally joined by injection zone 332. Dot shorts 334 extend the second base layer to the second major surface at spaced intervals. It may be readily observed that the gate layer, first emitter layer, first base layer, injection junction, first emitter junction, and base junction are identical to those of semiconductive element 200 and do not require redescription.

The semiconductive element 300 is distinctive in the configuration of the second emitter layer so that it is divided by an intervening portion 336 of the second base layer into a central auxiliary segment 338 and a main segment 340. It is to be noted that the outer edge of the injection junction and gate layer are located in lateral proximity to the inner edge of the main segment. In the preferred form the outer periphery of the gate layer and the inner periphery of the main segment are along a common annular boundary drawn normal to the major surfaces of the semiconductive element. It is appreciated that a slight lateral overlap or spacing of the main segment and gate layer may be acceptable so long as lateral adjacency is maintained. The auxiliary segment of the second emitter layer is noted to be spaced inwardly from the outer edge of the gate layer by the radial width of the intervening portion. The inner edge of the auxiliary segment extends inwardly beyond the inner edge of the gate layer. A metal conduction layer 150 overlies the second major surface of the semiconductive element from a location overlying the intervening portion of the second base layer, but spaced laterally inwardly from the main segment, to a location spaced laterally inwardly of the inner edge of the injection junction, but laterally outwardly of the inner edge of the auxiliary segment. It is to be noted that the metal conduction layer provides a low impedance conductive path from the auxiliary segment to the intervening portion of the second base layer across the outer edge of the portion of the second emitter junction associated therewith.

In analyzing the semiconductive element 300 it should be noted that the auxiliary zone of the first emitter layer and the conduction layer 106 are associated with a portion of the first major surface that overlaps a portion of the second major surface associated with the auxiliary segment of the second emitter layer and the conduction layer 150. Thus, inwardly of the gate layer a PNPN sequence of zones exist which may be viewed as an auxiliary thyristor for which the conduction layer 106 may serve as the anode and the conduction layer 150 may serve as the cathode when the first emitter layer is of P conductivity type.

It is to be noted that the second major contact layer 110*a* the backup plate 114*a*, and the metal layer 118*a* are modified in that they do not extend inwardly beyond the inner edge of the main segment of the second emitter layer, but are spaced slightly outwardly therefrom. The insulative spacer 138*a* is related to the gate lead and back up plate identically as the spacer 138. Similarly as for the semiconductive element 200, the first major contact and the main zone of the first emitter layer are associated with a portion of the first major surface which overlaps a portion of the second major surface associated with the main segment of the second emitter layer and the second major contact. Thus, the portion of the semiconductive element 300 lying exterior the inner edge of the gate layer may be seen to be analogous to a main current carrying remote gate thyristor.

The FIG. 3 embodiment of my invention blocks current flow when reverse biased and when forward biased, in the absence of a gate signal, similarly as described in connection with the preceding embodiment. The FIG. 3 embodiment is, however, distinctive in its switching characteristics from its forward biased blocking mode to its conducting mode. Assuming for convenience that the first emitter layer is of P conductivity type, so that the first terminal member serves as the device anode, increasing the positive potential of the gate terminal with respect to the cathode causes the auxiliary thyristor portion of the device lying inwardly of the inner edge of the gate layer to be switched into conduction. When this occurs current flows from the first major contact laterally through the first emitter layer, laterally through the gate layer, through the conduction layer 106, through the auxiliary zone, through the central portion of the base layers, through the auxiliary segment of the second emitter layer, through the conduction layer 150, through the intervening portion of the second base layer, and through the main segment of the second emitter layer to the second major contact and cathode of the device. As in the case of the semiconductive element 200 the potential drop caused by lateral current flow through the gate layer causes electron injection from the gate layer into the second base layer to break down the depletion layer associated with the base junction. At the same time a lateral potential drop is created by the lateral current flow at the inner edge of the main segment of the second emitter layer. Thus electron injection is also induced from the inner edge of the main segment into the second base layer to break down the depletion layer associated with the base junction. The effectiveness of the auxiliary thyristor portion in switching the main current carrying thyristor portion is accordingly significantly enhanced, since charge injection to the blocking base junction is occurring simultaneously from both sides thereof. Further, the charges are impinging upon what may be identical or very closely adjacent areal portions of the base junction. THe result is that the speed and reliability with which the semiconductor device may be switched to its conducting mode is greatly enhanced.

It is to be noted that both the conduction layers 106 and 150 are free of direct conductive association with the terminals of the semiconductor device, except through the semiconductive element. The dielectric body 122*a* is shown overlying the conduction layer 106 centrally of backup plate 112. It is to be noted that the central dielectric body in this embodiment does not extend downwardly into the well 128 in the first terminal member 124. This arrangement is advantageous in that the backup plate after attachment to the first major surface of the semiconductive element can serve as the sole retaining dam for the central dielectric material during formation. In such case the well in the terminal member may be omitted entirely. If desired, a similar body of dielectric material may be formed to overlie the conduction layer 150 and the second major surface of the semiconductive element located centrally of the backup plate 114*a*. Such dielectric body could be readily consolidated with the spacer 138*a*. It is considered a distinctive structural feature that I leave both the conduction layers 106 and 150 floating, that is, free of direct conductive ohmic association with terminal leads for the device, although the layers may be provided with external leads, if desired. For example, current may be conducted from such a lead to trigger one or more additional thyristors. As previously described the spacing between the gate layer and inner edge of the first major contact is chosen so that the portion of the first emitter layer therebetween provides a resistance to current flow through the auxiliary thyristor portion sufficient to produce a potential difference thereacross of at least one half of the contact voltage of the injection junction, thereby insuring that the current flow to the auxiliary thyristor is uniformly distributed around the outer edge of the conduction layer 106. Similarly the spacing between the outer edge of the conduction layer 150 and the inner edge of the main segment of the second emitter layer is chosen to provide a lateral resistance through the intervening portion of the second base layer sufficient to produce a potential difference in series with the inner edge of the second emitter junction at least one half the contact voltage of that junction. This insures that auxiliary thyristor current flows uniformly from the outer edge of the conduction layer 150 to the inner edge of the second injection layer without crowding of current at a point of minimum spacing therebetween.

FIGS. 4, 5, 6*a*, and 6*b* are illustrative of a third embodiment of my invention. Portions of the third embodiment necessary to form a complete semiconductor device not shown or specifically described may be identical to corresponding portions of the semiconductor device 100 and have been omitted as superfluous to an understanding of the invention.

Semiconductive element 400 is provided with a first major surface 402 and a second major surface 404 joined by positively beveled edge 406 and negatively beveled edge 408. The semiconductive element is provided with five sequentially arranged layers extending between the opposed major surfaces. A first endmost or gate layer 410 is located adjacent the first major surface. An adjacent intermediate layer, first emitter layer 412, also lies adjacent the first major surface. First base layer 414 is located adjacent the first emitter layer while second base layer 416 is located between the first base layer and the second emitter layer 418, which forms the second endmost layer and lies adjacent the second major surface. Adjacent of the sequential layers are of opposite conductivity type so that junctions are formed therebetween. An injection junction 420 is located between the gate layer and the first emitter layer. A first emitter junction 422 is located between the first emitter layer and the first base layer. A base junction 424 is located between the first and second base layers, and a second emitter junction 426 is located between the second base layer and the second emitter layer.

It is to be noted that the gate layer is comprised of an inner active annular portion 410*a* and an outer active annular portion 410*b* laterally spaced therefrom. The inner and outer active portions are integrally joined by radial finger portions 410*c*. The gate layer forms the first emitter layer into a plurality of main zones 412*a*, a first auxiliary zone 412*b* lying interiorly of the inner portion of the gate layer, and a second auxiliary zone 412*c* lying exteriorly of the outer portion of the gate layer. An injection zone 412*d* integrally joins adjacent main and auxiliary zones. A conduction layer portion 106*a* covers the entire first auxiliary zone 412*b* adjacent the first major surface and overlaps the inner periphery of the injection junction 420. A second conduction layer portion 106*b* overlies the inner portion of the second auxiliary zone 412*c* and overlaps the outer periphery of the injection junction. A plurality of conduction layer portions 106*c* extend between the integrally join the first and second conduction layer portions. The conduction layer portions 106*c* overlie radial finger portions of the gate layer and are spaced from the injection junction.

It is to be noted that the radial finger portions 410*c* of the gate layer and the conduction layer portions 106*c* are associated with a portion of the first major surface of the semiconductive element that overlaps a portion of the second major surface associated with the auxiliary segment portions 438*c* of the second emitter layer and the conduction layer portions 150*c*. That is, the pattern of radial fingers associated with the opposite major surfaces of the semiconductive element are aligned in a direction normal to the major surfaces. At the same time it can be seen that the conduction layer portion 106*a* and auxiliary zone 412*b* are associated with a portion of the first major surface that overlaps a portion of the second major surface associated with the auxiliary segment portion 438*a* and conduction layer portion 150*a*. Similarly, the conduction layer portion 106*b* is associated with the auxiliary zone 412*c* over a portion of the first major surface that overlaps a portion of the second major surface associated with the auxiliary segment portion 438*b* and conduction layer portion 150*b*. Thus, the semiconductive element may be noted to form a central auxiliary thyristor portion lying inwardly of the inner periphery of the injection junction and a peripheral auxiliary thyristor portion lying exteriorly of the outer periphery of the injection junction. These two auxiliary thyristor portions are conductively joined by the radially extending portions 106*c* and 150*c* of the conduction layers.

The second emitter layer is divided into an auxiliary segment 438 and a plurality of main segments 440. The auxiliary segment is comprised of a central auxiliary segment portion 438*a*, which is of annular configuration, and an outer auxiliary segment portion 438*b*, also annular. These laterally spaced annular auxiliary segment portions are integrally joined by a plurality of radially extending auxiliary segment portions 438*c*. A first conduction layer portion 150*a* overlies the auxiliary segment portion 438*a* and extends outwardly beyond the periphery thereof to contact a portion of the second base layer adjacent the second major surface intermediate the first annular auxiliary segment portion and the inner periphery of the main segment. The conduction layer portion 150*a* is laterally spaced inwardly from the inner edge of the main segment. A conduction layer portion 150*b* overlies the annular auxiliary segment portion 438*b* and similarly extends inwardly to contact a portion of the second base layer adjacent the second major surface intermediate the auxiliary segment portion 438*b* and the outer edge of the main segment. Again the conduction layer portion 150*b* is spaced laterally from the edge of the main segment. The conduction layer portions 150*a*, 150*b*, and 150*c* short the edge of the second emitter junction of the auxiliary segment nearest the main segment. The conduction layer portions 150*a* and *b* are integrally joined by connecting finger conduction layer portions 150*c* which overlie the radially extending auxiliary segment portions 438*c*.

The main thyristor portions of the semiconductive element are noted to lie between the inner and outer auxiliary thyristor portions and between the portions radially laterally connecting these auxiliary thyristor portions. A first major contact is noted to be made up of a plurality of segments 108*a* associated with the main zones 412*a* of the first emitter layer. A second major contact is comprised of a plurality of segments 110*b* associated with portions of the second major surface formed by the main segments 440. The second major contact segments lie laterally inwardly from the periphery of the main segments. The first major contact segments 108*a* are associated with the first emitter layer main conduction zones over portions of the first major surface that overlap areas of the second major surface associated with the main segments of the second emitter layer and segments of the second major contact. Thus, a plurality of main current carrying thyristor portions are formed.

In order to avoid inadvertent contact of the backup plates 112*a* and 114*b* with the conduction layer portions 106*c* and 150*c*, respectively, the backup plates are provided with grooves 152 adjacent their inner faces. Since the outer major surfaces of the backup plates are not affected, the metal layers 116*a* and 118*b* may be substantially identical to the layers 116 and 118 previously described. The gate metallization 102 may also be identically formed as previously described. The dielectric body 120*a* may be formed similarly as the dielectric body 120. The dielectric body 122*b* is shown formed of a glass passivant applied to the first major surface of the semiconductive element prior to association of the backup plate 112*a* therewith.

The embodiment of my invention shown in FIGS. 4, 5, 6*a*, and 6*b* is similar to the FIG. 3 embodiment of my invention in its general operating characteristics, but offers switching advantages in addition to those of the previously described embodiment. In switching into conduction when forwardly biased as a result of a gate signal, the central auxiliary thyristor portion of the semiconductive element 400 behaves generally similarly as the auxiliary thyristor portion of the semiconductive element 300. Additionally, however, a portion of the current flowing through the conduction layers 106*a* and 150*a* is shunted laterally by the conduction layer portions 106*c* and 150*c* to the outer annular portions 106*b* and 150*b* of these conduction layers. This then turns on the outer annular auxiliary thyristor portions of the semiconductive element. Breakdown of the base junction by charge injection to the layers on opposite sides thereof then not only spreads laterally outwardly to turn on the main thyristor portions, but simultaneously the base junction depletion layer is broken down adjacent the outer edge of the main segments and turn on also proceeds inwardly. With turn on of the main current carrying thyristor portions proceeding both inwardly and outwardly simultaneously the rate of device turn on is increased.

Another distinctive operational advantage of the semiconductive element 400 may be appreciated when the possibility is considered of turn on of the device as a result of surface currents, a high rate of voltage increase, or avalanche produced by an excessively large potential difference applied across the main current carrying terminals—i.e., device turn on mechanisms initiated by means other than a gate applied signal. For example, considering the situation in which the semiconductive element is not adequately beveled or passivated over its outer periphery, it can be readily appreciated that a voltage transient will have the effect of turning the device on adjacent its outer edge. In a conventional thyristor the high current density produced by turn on in this manner will cause localized overheating and destroy the semiconductive element. Even in my inventive embodiment the central auxiliary thyristor portion being laterally removed from the outer periphery of the semiconductive element is ineffective to protect the device from excessive di/dt localized adjacent the outer edge of the device. The outer annular auxiliary thyristor portion, however, will be readily turned on by such a peripheral current and can be relied upon to protect the device from failure due to localized turn on of the device at or near the edge of the semiconductive element. Even though the semiconductive element may be adequately beveled and passivated to prevent surface currents turning on the semiconductive element, turn on of the device at a localized area due to avalanche through the bulk of the semiconductive element may nevertheless occur and, unless the current density is maintained at an acceptably low level by rapid current spreading, destruction of the device may occur. By distributing the auxiliary thyristor portions so that they are present adjacent both the center and outer periphery of the semiconductive element the opportunity of turning on an auxiliary thyristor portion and accelerating current spreading before damage to the semiconductive element can occur is enhanced.

FIG. 7 illustrates an embodiment of my invention generally similar to the embodiment of FIG. 3, but providing novel ballasting arrangements. Only the structure of the semiconductive element and the conduction layers is described in detail, since remaining device elements may be identical to those previously described in connection with FIG. 3.

The semiconductive element 500 is provided with a first major surface 502 and a second major surface 504 joined by a positively beveled peripheral surface 506 and a negatively beveled peripheral surface 508. An endmost gate layer is divided into an active outer gate layer segment 510*a* and an inner ballasting segment 510*b*. Next adjacent thereto is provided a first emitter layer 512. Interiorly of the first emitter layer is a first base layer 514 followed by a second base layer 516. A second emitter layer 518 is provided adjacent the second major surface. The layers are formed with adjacent layers being of opposite conductivity type, so that an injection junction 520 is formed between the gate layer and first emitter layer, a first emitter junction 522 is formed between the first emitter layer and the first base layer, a base junction 524 is formed between the base layers, and a second emitter junction 526 is located between the second base layer and second emitter layer. The second emitter layer is divided into two auxiliary segments 538*a* and 538*b*, where segment 583*a* is the active auxiliary segment and 538*b* is the ballasting auxiliary segment. The second emitter layer additionally includes a main segment 540.

The voltage blocking characteristics of the semiconductive element 500 may be identical to those of the semiconductive element 300. When the first emitter layer is of P conductivity type and the first major contact associated therewith is at a positive potential as compared with the potential of the second major contact, the semiconductive element 500 may be switched to its conductive mode rendering the gate terminal of the device positive with respect to the device cathode terminal. This triggers into conduction an auxiliary thyristor portion lying laterally inward of the outer gate layer segment 510*a*. The anode of the auxiliary thyristor portion is formed by annular conduction layer 154 while the cathode is formed by annular conduction layer 156. The cathode emitter layer for the auxiliary thyristor portion is formed by auxiliary segment 538*a*. It is to be noted that the conduction layer 154 is laterally offset from the auxiliary segment 538*a*. Current flow for the auxiliary thyristor portion is from the first major contact laterally through the first emitter layer to the outer segment of the gate layer, laterally through the outer segment of the gate layer to the conduction layer 154, from the conduction layer 154 through the first emitter layer and base layers to the inner auxiliary segment 538*a* of the second emitter layer, laterally through the conduction layer 156 and laterally through the second base layer to the inner edge of the main segment of the second emitter layer to the second major contact. Normally no significant portion of the current flows through the inner segment of the gate layer or the outer auxiliary segment of the second emitter layer. Turn on of the main current carrying thyristor portion of the semiconductive element 500, which is identical to that of the semiconductive element 300, is achieved by simultaneous electron injection from the outer edge of the gate layer and the inner edge of the main segment of the second emitter layer.

The advantage of the structural arrangement of semiconductive element 500 is in its insurance that charge injection will occur along the entire inner periphery of the main segment of the second emitter layer and the entire outer periphery of the gate layer, rather than occurring only at a localized point. In preceding embodiments it is to be noted that I have specified a minimum resistance for the portion of the first emitter layer carrying current to the auxiliary thyristor portion from the first major contact. In the FIG. 5 embodiment a series resistance is noted to be provided by the lateral offset of the conduction layer 154 from the inner auxiliary segment of the second emitter layer. The inner segment of the gate layer in reducing the width of the first emitter layer available for current flow further contributes to the value of the series resistance. Uniform turn on of the inner edge of the main segment of the second emitter is assured by the series resistance increasing effect of the outer auxiliary segment of the second emitter layer, which is unavailable for current flow therethrough, restricting the width of the second base layer that is available for current flow.

While I have described my invention with reference to certain illustrative preferred embodiments, it is appreciated that numerous variations will readily occur to those skilled in the art. For example, while I prefer to utilize the device housing of FIG. 1, it is appreciated that a wide variety of alternative device housing constructions are available and may be substituted in whole or in part. The device housing need not be hermetically sealed, but where the device is hermetically sealed the dielectric body 120 may be omitted. While device operation has been described by reference to the first emitter layer as a P conductivity type layer and the first terminal member as the device anode, it is appreciated that the first emitter layer may be of N conductivity type and the first terminal member may serve as the device cathode.

While I have described my invention with reference to a center gate semiconductive element, it is appreciated that my invention may be practiced with a peripheral gate, a laterally positioned gate, a distributed gate, or other conventional geometric arrangements for thyristor elements. The gate lead need not be associated with the second base layer, but may be associated with the first base layer, if desired. Assuming a peripheral or distributed gate, for example, gate attachment for the device embodiment of FIGS. 4, 5, 6*a*, and 6*b* would be peripherally outwardly of the second emitter layer.

In this circumstance the inner auxiliary segment of the second emitter layer could (but need not) be omitted, as well as the inner portion of the gate layer. With a center gate either the outer portion of the gate layer or the outer portion of the auxiliary segment of the second emitter layer could be omitted without loss of ability to turn on the device due to nongate generated currents. The finger portions of the auxiliary segment may be retained even if the outer or inner portions of the auxiliary segment are omitted, since it is noted that the finger portions of the auxiliary segment are active during device turn on. The number of radially extending portions associated with the first and second major surfaces is not critical, four being shown merely as exemplary. The provision of grooves in the backup plate to avoid contact with the radially extending portions of the conduction layers is not essential. These radial portions may be covered by a thin insulative layer or may be formed sufficiently thin compared to the thickness of the major contacts so that the backup plates do not touch these layers. Alternately, the conduction layer portions extending radially may be associated with portions of the semiconductive element etched down from the major surfaces to provide clearance between the conduction layers and the backup plates. It is appreciated that the radially extending portions of the auxiliary segment and the gate layer may be omitted entirely when the radial portions of the conduction layers are omitted. In such circumstance the conduction shunt connection between the inner and outer annular portions of the conduction layers may be separate, suitably insulated shunt wires or other discrete connectors. In one form the radially extending portions of the conduction layers may be electrically insulated from the major surfaces of the semiconductive element although supported thereby. In this instance also the radial portions of the gate segment and auxiliary segment may be omitted. This offers the advantage of allowing the main thyristor portion to be unitarily formed rather than being subdivided into quadrants as shown.

The resistance between the outer edge of the gate layer and the inner edge of the first major contact may be increased by etching the semiconductive element from its first major surface. Similarly, the resistance between the outer edge of the conduction layer and the inner edge of the main segment of the second emitter layer may be increased by etching the semiconductive element from its second major surface. Neither of these approaches is considered as desirable as the incorporation of diffused segments, however, as shown in FIG. 5, since diffusion depths may be controlled with greater accuracy than the depth of etching. In addition to shorting the second base layer to the second major contact as show, it is appreciated that the first base layer may be shorted to the first major contact in like fashion. While preferred for device stability, as is well understood in the art, shorting of either or both of the base layers to the major contacts is not required.

Having described my invention with reference to certain preferred embodiments, it is appreciated that numerous variations will readily occur to those skilled in the art. It is accordingly intended that the scope of my invention be determined with reference to the following claims.

What I claim and desire to secure by Letters Patent of the United States is:

1. A thyristor comprised of
- a semiconductive element including five layers of one and the opposite conductivity type, said layers being interleaved with adjacent layers being of opposite conductivity type and forming a plurality of PN junctions, said layers including a first endmost layer and a first intermediate layer next adjacent thereto,
- said first intermediate layer including a main zone and an auxiliary zone having said first endmost layer interposed therebetween and an injection zone integrally uniting said main and auxiliary zones,
- a first major contact ohmically associated with said main zone,
- a second major contact ohmically associated with a remaining endmost of said layers,
- a gate contact ohmically associated with an intermediate layer other than said first intermediate layer, and
- means providing a junction bridging conductive path from said auxiliary zone to said first endmost layer.

2. A thyristor according to claim 1 additionally including means isolating said junction bridging conductive path means from conductive association with said major contacts other than through said semiconductive element.

3. A thyristor according to claim 1 additionally including dielectric means located adjacent a portion of said semiconductive element laterally offset from said first major contact and overlying said first endmost layer and said junction bridging conductive path providing means.

4. A thyristor according to claim 1 in which said gate is associated with a central portion of said second major surface of said semiconductive element and said first endmost layer is annular and spaced outwardly from said gate.

5. A thyristor according to claim 1 additionally including series resistance means associated with said first intermediate layer to insure uniform peripheral turn on of said main zone thereof.

6. A thyristor according to claim 1 in which said first endmost layer is divided into a first segment next adjacent to said main zone serving as a charge injection source and a laterally spaced second segment spaced from said main zone by said first segment, said second segment constricting the width of said first intermediate layer adjacent thereto to increase the lateral resistance of said first intermediate layer.

7. A thyristor according to claim 1 additionally including means associated with the periphery of said semiconductive element for reducing surface currents.

8. A thyristor according to claim 1 in which said first endmost layer is located laterally inwardly of said main zone and in which beveled peripheral edge means of said semiconductive element is provided for reducing surface potential gradients.

9. A thyristor according to claim 1 additionally including a main current carrying terminal means, conductive plate means interposed between said terminal means and said first major contact, and dielectric means associated with said semiconductive element positioning said conductive plate means relative to said terminal means.

10. A thyristor comprised of a semiconductive element including five layers of one and the opposite conductivity type extending between opposed major surfaces, said layers being interleaved with adjacent layers being of opposite conductivity type and forming a plurality of PN junctions, said layers including a first endmost layer and a first intermediate layer next adjacent thereto, said first intermediate layer including a main zone and an auxiliary zone having said endmost layer interposed therebetween and an injection zone integrally uniting said main and auxiliary zones, a first major contact ohmically associated with said main zone, means providing a junction bridging conductive path from said auxiliary zone to said first endmost layer.

a second major contact ohmically associated with a second endmost of said layers, said second endmost layer including a main portion and an auxiliary portion, said first and second major contacts, said main portion, and said main zone being associated with overlapping areas of said opposed major surfaces, said second major contact, said auxiliary portion, said auxiliary zone, and said conductive path means being associated with overlapping areas of said opposed major surfaces, and a gate contact ohmically associated with an intermediate layer other than said first intermediate layer at a location laterally offset form said main zone by said injection zone.

11. A thyristor comprised of a semiconductive element including five layers of one and the opposite conductivity type extending between opposed major surfaces, said layers being interleaved with adjacent layers being of opposite conductivity type and forming a plurality of PN junctions, said layers including a first endmost layer and a first intermediate layer next adjacent thereto, said first intermediate layer including a main zone and an auxiliary zone having said first endmost layer interposed therebetween and an injection zone integrally uniting said main and auxiliary zones, a second endmost layer being divided by a second intermediate layer next adjacent thereto into an auxiliary segment and a main segment, first means providing a junction bridging conductive path from said auxiliary zone to said first endmost layer, second means providing a junction bridging conductive path from said auxiliary segment to a portion of said second intermediate layer adjacent said main segment, a first major contact ohmically associated with said main zone, a second major contact ohmically associated with said main segment, said first and second main contacts, said main zone, and said main segment being associated with overlapping areas of said opposed major surfaces, said first conductive path means, said auxiliary zone, and said auxiliary segment being associated with overlapping areas of said opposed major surfaces, said first endmost layer being located in lateral proximity to said main segment, and a gate contact ohmically associated with an intermediate layer other than said first intermediate layer at a location offset from said main conduction zone by said injection zone.

12. A thyristor according to claim 10 in which said auxiliary segment of said second endmost layer is divided into a first auxiliary segment and a laterally spaced second auxiliary segment, said first auxiliary segment being associated with said second conductive path means and said second auxiliary segment being laterally spaced from and interposed between said first auxiliary segment and said main segment constricting the width of said second intermediate layer adjacent thereto to increase the lateral resistance of said second intermediate layer.

13. A thyristor comprised of a semiconductive element including five layers of one and the opposite conductivity type extending between opposed major surfaces, said layers being interleaved with adjacent layers being of opposite conductivity type and forming a plurality of PN junctions, said layers including a first endmost layer and a first intermediate layer next adjacent thereto, said first endmost layer being formed as a plurality of laterally spaced first segments, said first intermediate layer including a main zone extending between said laterally spaced first segments, an auxiliary zone separated from said main zone by one of said first segments, and a plurality of injection zones lying interiorly of said first segments, said zones being integrally joined, a first major contact ohmically associated with said main zone, means providing a junction bridging conductive path from said auxiliary zone to a plurality of said first segments, additional contact means ohmically associated with a second endmost of said layers including a main portion and an auxiliary portion said auxiliary portion, said auxiliary zone, said conductive path means, and said additional contact means being associated with overlapping areas of said opposed major surfaces, said first major contact, said main portion, said main zone, and said additional contact means being associated with overlapping areas of said opposed major surfaces, and a gate contact ohmically associated with an intermediate layer other than said first intermediate layer at a location offset from said main zone by one of said injection zones.

14. A thyristor according to claim 13 in which a second intermediate layer adjacent said second endmost layer divides said main portion and said auxiliary portion thereof into laterally spaced relation and said additional contact means includes a second major contact associated with said main portion and means providing a junction bridging conductive path from said auxiliary portion to a portion of said second intermediate layer separating said main and auxiliary portions.

15. A thyristor according to claim 13 in which said auxiliary segments are integrally joined.

16. A thyristor according to claim 13 in which said auxiliary segments are integrally joined and said conductive path means is comprised of conduction means ohmically associated with said semiconductive element at the integral joinder of said auxiliary segments.

17. A thyristor according to claim 13 in which said auxiliary segments are located adjacent spaced edge portions of said main zone and said auxiliary segments include interconnecting means.

18. A thyristor according to claim 13 in which a plurality of auxiliary zones are provided each separated from said main zone by one of said auxiliary segments.

19. A thyristor comprised of a semiconductor crystal including five layers of one and the opposite conductivity type extending between opposed major surfaces, said layers being interleaved with adjacent layers being of opposite conductivity type and forming a plurality of PN junctions, said layers including a first endmost layer and first intermediate layer next adjacent thereto, said first endmost layer being formed as a plurality of laterally spaced active portions, said first intermediate layer including a main zone extending between said laterally spaced active portions, a plurality of auxiliary zones each separated from said main zone by one of said active portions, and an injection zone lying directly interiorly of said first endmost layer integrally joining said zones, a first major contact ohmically associated with said main zone, first means providing a junction bridging conductive path from each of said auxiliary zones to adjacent of said active portions, a second endmost layer being divided by a second intermediate layer next adjacent thereto into a main segment and an auxiliary segment including spaced active auxiliary portions, second means providing a junction bridging conductive path from said spaced active auxiliary portions to said second intermediate layer adjacent said main segment, a second major contact ohmically associated with said main segment, said first and second main contacts, said main zone, and said main segment being associated with overlapping areas of said opposed major surfaces, said first conductive path means, said auxiliary zones, and said auxiliary segment being associated with overlapping areas of said opposed major surfaces, said active portions being located with an edge in lateral proximity to said main segment, and a gate contact ohmically associated with an intermediate layer other than said first intermediate layer at a location laterally offset from said main conduction zone by one of said injection zones.

20. A semiconductor switch comprising a single semiconductive crystal means having integrated therein a remote gate main current carrying thyristor crystal means and an auxiliary thyristor crystal means, each of said thyristor crystal means including a first emitter layer, a first base layer, a second base layer, and a second emitter layer sequentially related, adjacent layers being of opposite conductivity type and forming a plurality of PN junctions therebetween, corresponding layers of main and auxiliary thyristor crystal means being integrally related, said main thyristor crystal means additionally including a gate layer forming an endmost layer adjacent said first emitter layer and lying adjacent the joinder of said thyristor crystal means, gate means associated with one of said base layers of said auxiliary thyristor means, means providing a junction bridging conductive path from said auxiliary first emitter layer to said main gate layer, a major current carrying contact ohmically associated with said main first emitter layer, and additional contact means ohmically associated with said second emitter layers.

21. A semiconductor switch comprising a single semiconductive crystal means having integrated therein a remote gate main current carrying thyristor crystal means and an auxiliary thyristor crystal means, said remote gate main current carrying thyristor means including a gate layer, a first emitter layer, a first base layer, a second base layer, and a second emitter layer sequentially related, adjacent layers being of opposite conductivity type and forming a plurality of PN junctions therebetween, said auxiliary thyristor means including a first emitter layer, a first base layer, a second base layer, and a second emitter layer sequentially related, adjacent layers being of opposite conductivity type and forming a plurality of PN junctions therebetween, corresponding layers of said main and auxiliary thyristor means being integrally related with said gate layer lying adjacent the joinder of said thyristor means, gate means associated with one of said base layers of said auxiliary thyristor means, common current carrying terminal means associated with said second emitter layers of said thyristor means, separate current carrying terminal means associated with each of said first emitter layers of said thyristor means and laterally spaced from said gate layer, and means for providing a conductive path between said auxiliary thyristor separate terminal means and an edge of said gate layer adjacent said auxiliary thyristor means for laterally biasing said gate layer in response to a signal supplied to said gate means so that charge injection by said gate layer into said anode base layer preferentially occurs along an edge closest to said terminal means associated with said first emitter layer of said main thyristor means.

22. A semiconductor switch according to claim 21 in which said auxiliary thyristor means is located adjacent opposed lateral extremities of said main current carrying thyristor means.

23. A semiconductor switch according to claim 21 additionally including means isolating said junction bridging conductive path means from conductive association with said terminal means other than through said semiconductive crystal means.

24. A semiconductor switch comprising a single semiconductive crystal means having integrated therein a remote gate main current carrying thyristor crystal means and an auxiliary thyristor crystal means, each of said thyristor crystal means including a first emitter layer, a first base layer, a second base layer, and a second emitter layer sequentially related, adjacent layers being of opposite conductivity type and forming a plurality of PN junctions therebetween, said main thyristor crystal means additionally including a gate layer forming an endmost layer adjacent said first emitter layer and lying adjacent the joinder of said thyristor crystal means, said first emitter and base layers of thyristor crystal means being integrally related and said second emitter layers of said main and auxiliary thyristor crystal means being laterally spaced, gate means associated with one of said base layers of said auxiliary thyristor crystal means, first means providing a junction bridging conductive path from said auxiliary first emitter layer to said main gate layer, second means providing a junction bridging conductive path from said auxiliary second emitter layer to a portion of said second base layer adjacent said main second emitter layer, and major contacts ohmically associated with said main emitter layers.